US008016323B2

(12) United States Patent
Hunt

(10) Patent No.: US 8,016,323 B2
(45) Date of Patent: Sep. 13, 2011

(54) SELF-ADHESIVE LABELS AND METHOD OF MANUFACTURE THEREOF

(75) Inventor: Colin Leslie Hunt, Suffolk (GB)

(73) Assignee: Denny Bros. Ltd., Suffolk (GB)

( * ) Notice: Subject to any disclaimer, the term of this patent is extended or adjusted under 35 U.S.C. 154(b) by 799 days.

(21) Appl. No.: 11/575,543

(22) PCT Filed: Sep. 20, 2005

(86) PCT No.: PCT/GB2005/050162

§ 371 (c)(1), (2), (4) Date: Mar. 19, 2007

(87) PCT Pub. No.: WO2006/048685

PCT Pub. Date: May 11, 2006

(65) Prior Publication Data

US 2008/0093834 A1 Apr. 24, 2008

(30) Foreign Application Priority Data

Sep. 20, 2004 (GB) .................................. 0420886.4

(51) Int. Cl.
*B42D 15/00* (2006.01)
*B32B 38/00* (2006.01)

(52) U.S. Cl. ......... 283/81; 283/101; 283/107; 428/40.1; 428/352; 156/253; 156/267

(58) Field of Classification Search .................... 283/81, 283/94, 98, 100, 101, 103, 105, 107, 109; 156/253, 268, 269, 299–301
See application file for complete search history.

(56) References Cited

U.S. PATENT DOCUMENTS

| | | | | |
|---|---|---|---|---|
| 3,524,271 | A * | 8/1970 | Buske | 40/638 |
| 3,524,782 | A * | 8/1970 | Buske | 156/248 |
| 4,661,189 | A * | 4/1987 | Voy et al. | 156/268 |
| 5,593,749 | A * | 1/1997 | Instance | 428/40.1 |
| 5,601,682 | A * | 2/1997 | Longtin | 156/272.2 |
| 5,658,631 | A * | 8/1997 | Bernstein et al. | 428/42.1 |
| 6,364,990 | B1 | 4/2002 | Grosskopf et al. | |
| 6,420,006 | B1 * | 7/2002 | Scott | 428/40.1 |
| 2006/0233995 | A1 * | 10/2006 | Garland | 428/41.8 |

FOREIGN PATENT DOCUMENTS

| | | |
|---|---|---|
| DE | 40 26 208.1 | 2/1992 |
| EP | 0018452 A1 | 11/1980 |
| GB | 2 319 508 | 5/1998 |
| WO | 03054837 A1 | 7/2003 |

* cited by examiner

*Primary Examiner* — Shelley Self
*Assistant Examiner* — Pradeep C Battula
(74) *Attorney, Agent, or Firm* — Volpe and Koenig, P.C.

(57) ABSTRACT

The self-adhesive label (3) is provided on a web of siliconised polyester liner (4) and has a base label (30) with an upper printable surface and a lower adhesive coated surface and at least one patch of release material (38) located between the base label (30) and the web of siliconised polyester liner (4). By forming the patches of release material (38) on the adhesive surface of the base label (30) and then applying a siliconised polyester liner (4) over the patches (38) and the exposed adhesive surface of the base label (30), the resultant self-adhesive label is more robust and as the siliconised polyester liner (4) has a substantially continuous upper surface, the risks of snagging as a result of edges and windows in the web of backing material is avoided.

9 Claims, 5 Drawing Sheets

SELF-ADHESIVE LABELS AND METHOD OF MANUFACTURE THEREOF

The present invention relates to an improved method of manufacturing self-adhesive labels and to self-adhesive labels when manufactured according to that method.

Ever more complex self-adhesive label products are being developed to meet the needs of companies for labels which contain detailed information or instructions on their products, often in more than one language, that can be automatically applied by the companies to their products or to the packaging of their products in their production lines. Although the vast majority of such labels have adhesive extending over the whole of the rear surface of the label, sometimes referred to as the footprint of the label, for attachment to a product or product packaging, there are occasions where it is necessary for part of a label to be free of adhesive so that that part of the label remains unadhered when finally applied to a product or product packaging. Similarly, there is a need, especially in the pharmaceutical and agrochemical industries as well as with delivery services, for adhesive labels that include detachable portions that are intended for removal and attachment for example to separate documentation. Ideally, these detachable portions are printed so as to bear indicia enabling tracking between that portion of the label that is removed and the original adhesive label.

In order to produce self-adhesive labels of the type described above in an automated process, it is necessary for the labelstock material from which the labels are made to be back-cut, i.e. the rear of the labelstock material which is usually a web of silicone-coated paper or plastics material is die-cut, in addition to the die-cutting and printing of the upper surface of the labelstock material. Back-cutting of labelstock material however causes a number of problems. The rear surface of the labelstock material performs the function of a continuous supporting web for the labels that are produced. Back-cutting of the labelstock material introduces edges and windows in the supporting web which can snag on machinery both during manufacture and during transfer of the labels from the web to a product or product packaging. In addition, the presence of back-cut windows in the supporting web can demand greater spaces between adjacent labels across the width of the supporting web and thus reduce the number of labels that can be made simultaneously across the width of the web as well as increase the amount of wastage. The reason for this is that sufficient selvedge is required between labels to avoid tearing of the supporting web during the slitting of the web into single label width reels.

The present invention thus seeks to overcome at least some of the problems described above with respect to the back-cutting of labelstock material in the automated manufacturing of self-adhesive labels.

The present invention therefore provides a self-adhesive label manufacturing method comprising the steps of: providing a web of adhesive label material mounted on a web of release material; die-cutting patches in the web of release material; removing the web of release material from the web of adhesive label material other than said patches so as to expose the adhesive surface of said web of label material other than those regions of the adhesive surface covered by said patches; applying a web of siliconised polyester liner over the exposed adhesive surface of the web of label material and said patches of release material; die-cutting individual labels in the web of label material, the labels being aligned with said patches of release material; and removing the waste label material.

In an alternative aspect the present invention provides a reel of self-adhesive labels comprising a web of siliconised polyester liner having a substantially continuous upper surface on which are adhered in series a plurality of self-adhesive labels, each self-adhesive label comprising a base label having an upper printable surface and a lower adhesive coated surface and further comprising at least one patch of release material located between the base label and the web of siliconised polyester liner.

With the present invention, by forming the patches of release material on the adhesive surface of the base label and then applying a siliconised polyester liner over the patches and the exposed adhesive surface of the base label, the resultant reel of self-adhesive labels is more robust and is capable of being slit into single label wide reels with a minimum of selvedge along the longitudinal sides. Moreover, as the siliconised polyester liner has a substantially continuous upper surface, the risks of snagging as a result of edges and windows in the web of backing material is avoided.

Embodiments of the invention will now be described by way of example with reference to the accompanying drawings, in which.

Figure 1:
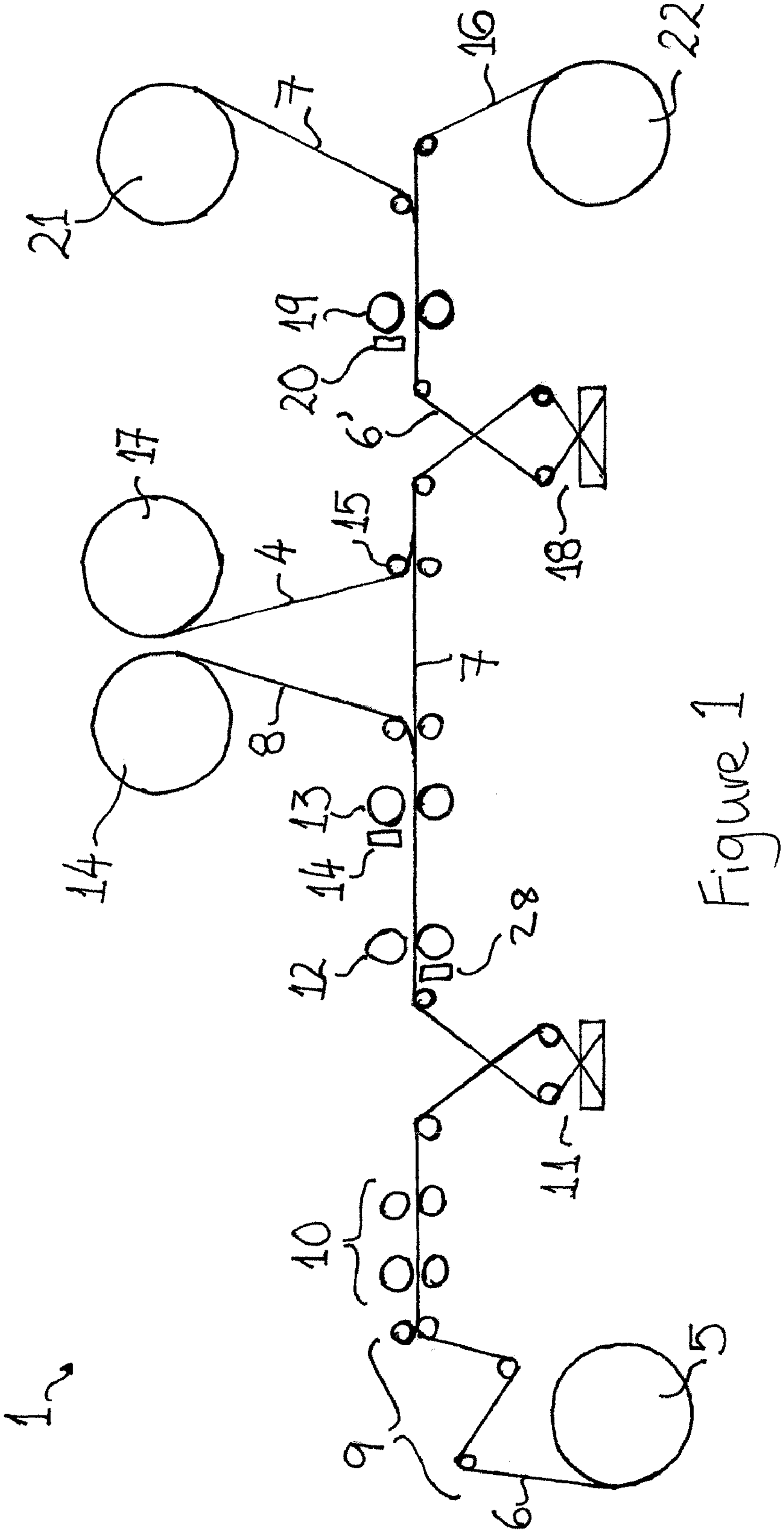
FIG. 1 is a schematic side view of a first section of an apparatus for manufacturing adhesive labels in accordance with the present invention.
Figure 4A:
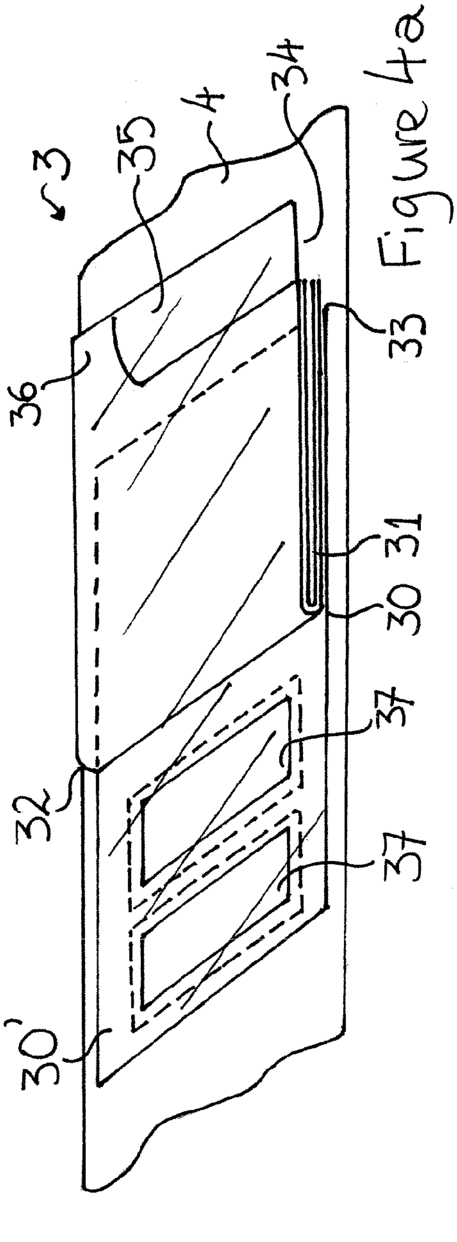
Figure 4B:
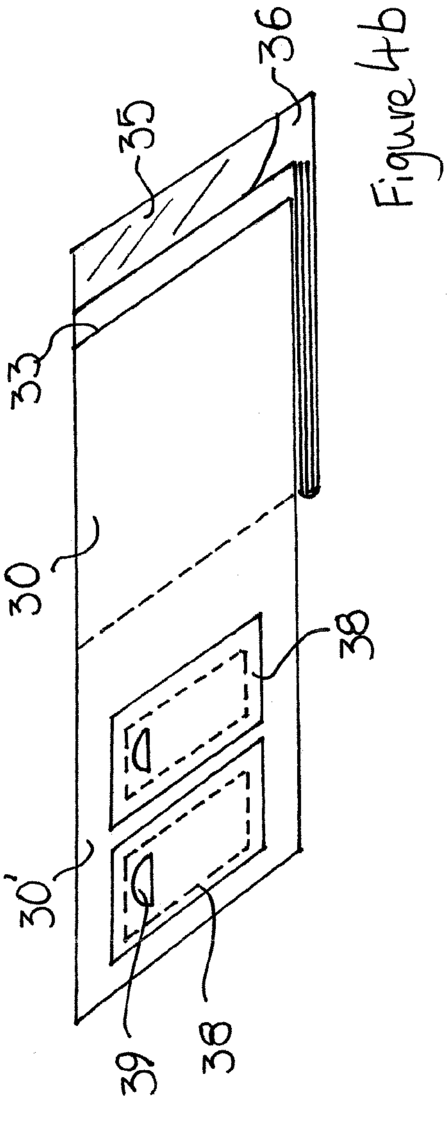
Figure 5A:
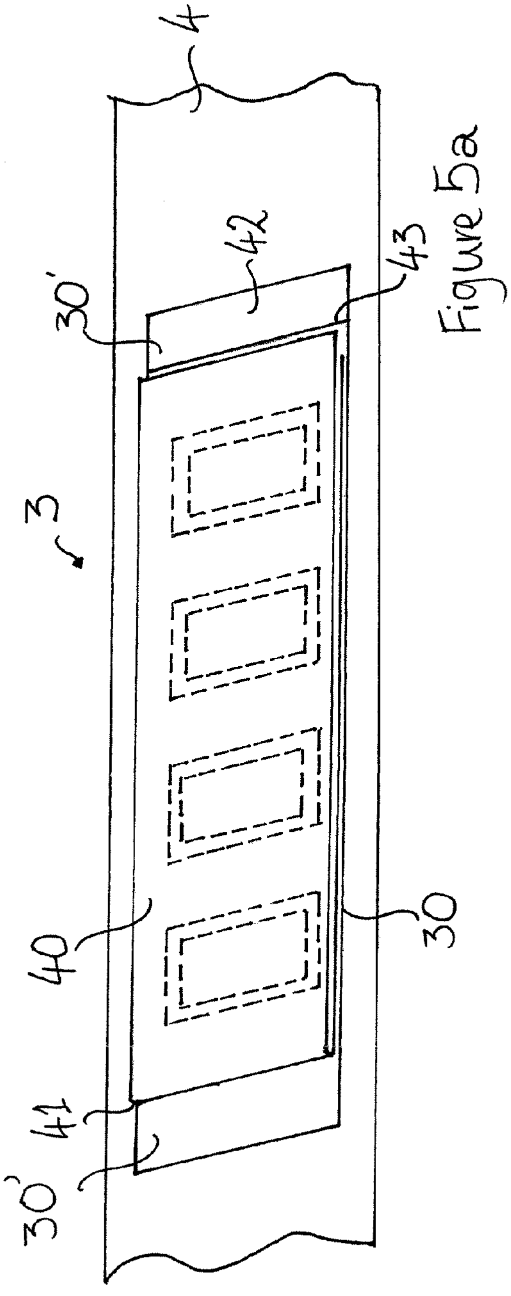
Figure 5B:
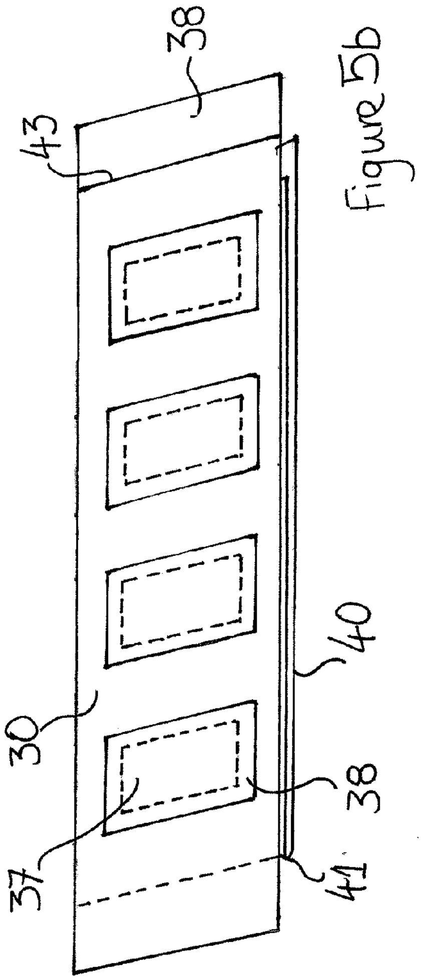
Figure 6A:
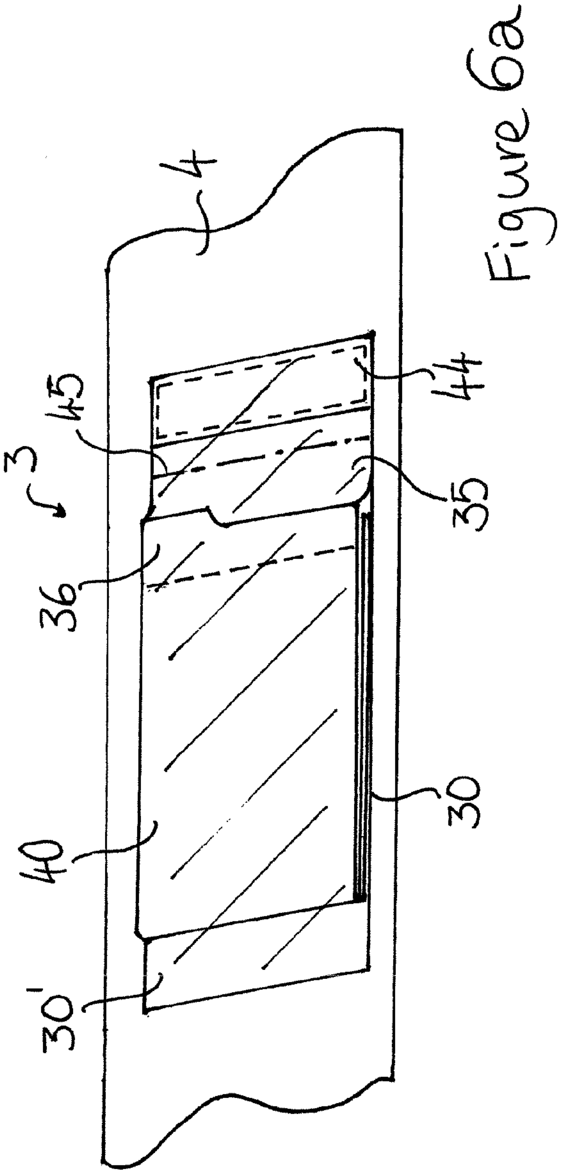
Figure 6B:
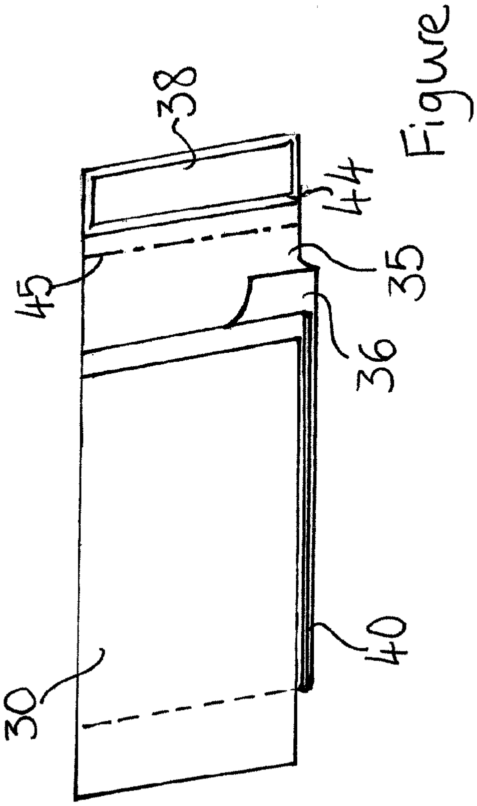

FIGS. 4*a* and 4*b* are schematic perspective views from above and below respectively of a first embodiment of an adhesive label manufactured using the apparatus as shown in FIG. 1;

FIGS. 5*a* and 5*b* are schematic perspective views from above and below respectively of a second embodiment of an adhesive label manufactured using the apparatus of FIG. 1; and FIGS. 6*a* and 6*b* are schematic perspective view from above and below respectively of a third embodiment of an adhesive label manufactured using the apparatus of FIG. 1.

With reference to FIG. 1, there is shown an adhesive label manufacturing apparatus for producing on a reel 2 a succession of laminated self-adhesive labels 3 spaced from each other lengthwise of the strip on a release web 4 in which, as illustrated in FIGS. 4*a*, 4*b*, 5*a*, 5*b*, 6*a* and 6*b*, the self-adhesive label has one or more a separate patches of release material provided on the rear of the label between the label and the release web 4.

The label manufacturing apparatus, generally designed as 1, includes a supply reel 5 of labelstock material 6 consisting of a web of label material 7 comprising of a paper or plastics material which is printable on a first surface and is coated on its opposite, second surface with a layer of pressure sensitive adhesive and which is, in turn, covered by a release web 8 of silicone-coated paper or plastics. Firstly, the labelstock material 6 is fed from the reel 5, with the printable surface of the label web 7 uppermost, through a series of conventional tensioning devices 9, of which only three are illustrated. The labelstock material 6 is then introduced, still with the printable first surface of the label web 7 uppermost, to a first series of printing stations 10 (two are illustrated in FIG. 1). The uppermost surface of the labelstock material 6 is printed with any index markings that are required for accurately controlling the synchronisation and alignment of all processes the labelstock material is to undergo during manufacture as well as any text and images that will appear on the final labels.

Preferably, two or more labels will be produced across the width of the labelstock material (i.e. transverse to the feed direction or length of the web) and the text and images for each label is separated from adjacent labels across the width of the labelstock material by selvedge regions.

After printing, the labelstock material 6 is fed to a first turn bar 11 which causes the labelstock material to be turned over so that the rear surface of the release web 8 of silicone-coated paper or plastics material is presented uppermost. The web of labelstock material is then fed through a second printing station 12 which prints indicia in the form of garage markings onto the rear surface of the release web 8 along with any other text or images that are required. The apparatus 1 may be set up so that the second printing station 12 is automatically aligned with the images/text printed by the first series of printing stations 10 on the labelstock material. Alternatively, a sensor 28 may be provided underneath the web of labelstock material 6 immediately upstream of the second printing station 12, as illustrated, so that the alignment of the images printed by the second printing station 12 are controlled with respect to index markings printed by the first printing station 10 on the labelstock material.

The labelstock material 6 is then fed to a rotary die-cutter 13 which makes cuts through the release web 8 but not through the printable label web 7 which currently faces rearwardly. The cuts made by the die-cutter 13 in the release web describe the boundary of patches formed in the release web 8, with one or more patches being associated with each label. Preferably, alignment of the patches formed in the release web 8 is controlled by means of a sensor 14 which is positioned upstream of the die-cutter 13 and which controls the timing of the die-cutter 13 with respect to the detection of the garage markings printed on the rear surface of the release material of the labelstock material. Alternatively, the sensor 14 may be positioned beneath the web of labelstock material so that the die-cutter 13 is controlled with respect to index markings printed by the first printing station on the label web of the labelstock material.

After die-cutting, the release web 8 is separated from the label web 7 and is collected as waste on a collection reel 14. The patches cut through the release web, however, become separated from the rest of the release web and remain attached to the label web 7. The label web 7 with an exposed layer of adhesive uppermost and also including the die-cut patches of release material is then passed to a laminating station 15 where a continuous release backing web 4, from a supply reel 17, is applied over the exposed layer of adhesive as well as the die-cut patches of release material. The release backing web 4 is preferably a siliconised polyester liner such as Fasson™ Polyester Clear which forms a smooth surface over the adhesive and the patches of release material and minimises rucking and bubble formation.

The double web 6' of release backing web 4 and label web 7 is then passed to a second turn bar 18 where the double web is turned over so that the label web 7 is again uppermost. The double web 6' is then passed to a second die-cutter 19 which makes cuts through the label web 7 and the adhesive layer, but not the release backing web 4, to define the individual labels. Depending upon the final design of the labels, the die cutter may additionally cut through the patches of release material that are sandwiched between the label web 7 and the release backing web 14. Preferably, alignment of the die-cuts with any printing on the label web and the patches of release material underneath the label web is achieved by means of a sensor 20 which is located upstream of the die-cutter 19 and which detects the previously printed index markings on the label web 7.

Figure 2:
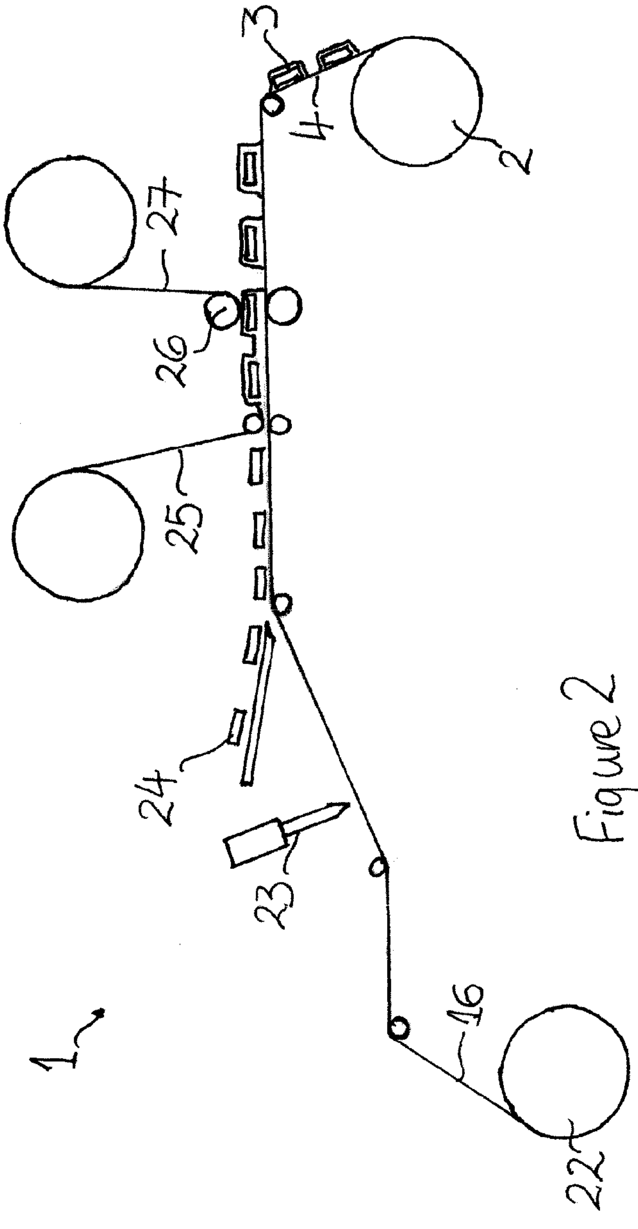
FIG. 2 is a schematic view of a second section of the apparatus for manufacturing adhesive labels in accordance with the present invention.

Once the labels have been formed in the label web, those areas of the label web which do not form labels are removed along with all waste adhesive and collected on a waste reel 21. The web of individual printed labels 16 comprising the release backing web with the printed labels and the patches of release material sandwiched between the printed labels and the release backing web may then be collected on a collection reel 22 with the labels facing outwardly, as illustrated in FIG. 1. The web of printed labels 16 is thus ready for final checking and slitting into reels of single label width. As the labels are mounted on a release backing web which has a substantially or wholly continuous surface, that is to say the release backing web 4 does not contain any holes of a size that might impede the passage of the web through label manufacturing and label applying machinery, the automated removal of the labels from the backing release web and their transfer to a company's product or product packaging is therefore not hampered by the web snagging in the label applying machinery. Moreover, as the release backing web 4 has a substantially or wholly continuous surface, the selvedge remaining each longitudinal side of a label after slitting, can be minimised.

Where more complicated self-adhesive labels are required, such as those incorporating large area leaflets or booklets, the reel 22 of individual labels on the release backing web 4 may be supplied to label making apparatus for further processing as illustrated in FIG. 2. Alternatively, the release backing web 4 with the individual labels may fed directly to further label making apparatus after the waste label web 7 has been removed in which case the apparatus illustrated in FIGS. 1 and 2 would be combined and the collection reel 22 omitted.

As shown in FIG. 2, the release backing web 4 with individual labels uppermost is fed from the reel to a glue station 23 where glue is applied to one or more regions of the upper surface of the label and optionally exposed regions of the release backing web 4. Folded printed leaflets or printed booklets 24 are then applied over the labels and are adhered by the adhesive applied by the glue station 23 to the labels and/or regions of the release backing web 4. It will, of course, be apparent that where the release backing web 4 has individual labels arranged in rows of two or more, the folded leaflets or booklets, for each row of labels, are preferably integral forming a single element (consisting of multiple leaflets or booklets) which extends across the entire row of labels.

A covering laminar material 25, such as but not limited to a transparent adhesive plastics material, may then be applied over the folded leaflets or booklets 24 and exposed upper surfaces of the labels and release backing web 4. Thereafter, the web is fed to a third die-cutter 26 which cuts the covering laminar material 25, the folded leaflets or booklets and where necessary the labels and patches of release material, but not the release backing web 4, to form individual laminated self-adhesive labels 3. The waste 27 is removed from around each of the individual self-adhesive labels and the labels on the continuous release backing web 4 is then collected on a collection reel 2.

Of course, although not illustrated, with the apparatus and method described above subsequent overprinting of the covering laminar material 27 is possible. Alternatively, the covering laminar material 27 may be omitted. Moreover, the folded leaflets or booklets may be omitted in which case the covering laminar material 27 may be applied directly to the upper surface of the individual labels. In a further alternative the folded leaflets or booklets may be placed over the labels without any adhesive to hold the leaflets or booklets in position. With this arrangement the covering laminar material 27 may be used instead to hold the leaflets or booklets in position. The method and apparatus described above is envisaged to accommodate further alternatives that have not been described but which also provide a label structure including one or more patches of release material on the rear of the label between the label and the release backing web.

Figure 3:
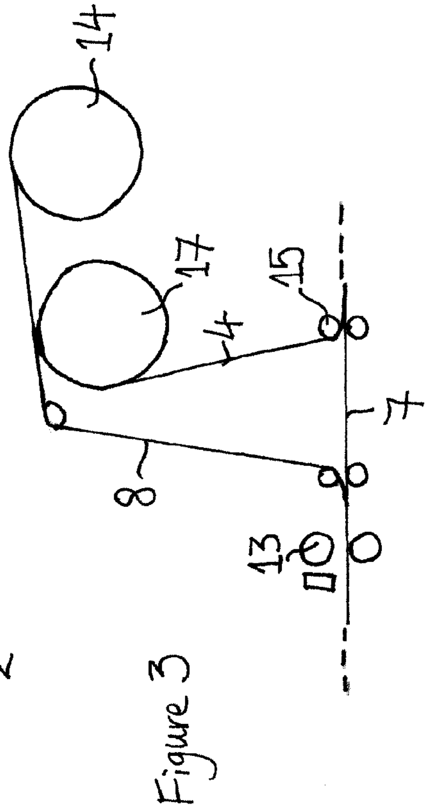
FIG. 3 is a schematic side view of part of the apparatus of FIG. 1.

In FIG. 3 an alternative arrangement of the collection reel 14 and the supply reel 17 is shown. As can be seen the release web waste 8 is guided past and in contact with the release backing web 4 being delivered from the supply reel 17. This slipping contact between the waste release web 8 and the release backing web 4 has been found to be beneficial in maintaining proper tension in the release backing web 4.

In FIG. 4*a* a self-adhesive label 3 constructed in accordance with the method and using the apparatus described above is illustrated from above on the release backing web 4 and is illustrated from below, without the release backing web 4. The self-adhesive label 3 includes a base label 30 and a booklet 31 with the booklet 31 positioned on the base label so as to leave a portion 30' of the upper surface of the base label exposed (to the left in FIG. 4*a*). The booklet 31 is secured to the base label by means of a line of adhesive (not illustrated), for example, located adjacent the spine 32 of the booklet. The booklet 30 overlies the right-hand portion of the base label and extends beyond a transverse edge 33 of the base label to overlie a region 34 of the release backing material adjacent the base label edge 33.

A covering adhesive laminar material 35, which is preferably transparent, extends over the exposed surface 30' of the base label and over the upper surface of the booklet 31. A portion of the adhesive laminar material 35 longitudinally extends beyond a part of the booklet 31 to overlie and adhere directly to the region 34 of the release backing web 4 adjacent the edge 33 of the base label. In this way the covering laminar material 35 acts to hold the booklet in a closed configuration when the label 3 is on the release backing web 4 and when the label 3 is transferred to a product or product packaging, the covering laminar material 35 similarly adheres to the surface of the product or product packaging to hold the booklet in a closed configuration. An unadhered tab 36 is provided in the form of a corner region of the cover sheet of the booklet which extends to the edge of the covering adhesive laminar material 35 to assist in the opening of the booklet 31. Preferably, as illustrated, the longitudinal edges (i.e. the edges aligned with the direction of movement of the web during manufacture) of the base label, booklet and covering laminar material are co-terminus.

The exposed portion 30' of the base label and the covering laminar material have been die-cut to form two stickers 37 which are separated from the remainder of the base label. Immediately beneath the stickers 37 and between the stickers 37 and the release backing web 4 are a respective pair of patches 38 of release material with the periphery of each of the patches 38 being located outside of the periphery of its corresponding sticker 37. As a patch 38 of release material is in contact with the rear surface of each of the stickers 37, the stickers are not adhered to the release backing web 4 and do not adhere to the product or product packaging when the label 3 is transferred.

As shown more clearly in FIG. 4*b*, the rear of the label 3, sometimes referred to as the footprint of the label, comprises the two patches 38 of release material surrounded by the rear adhesive surface of the remainder of the base label 30 and that portion of the booklet 31 which overlies the edge 33 of the base label including the tab 36 along with the adhesive surface of that part of the covering laminar material 35 which extends beyond the booklet 31. As the patches 38 of release material are surrounded by the adhesive rear surface of the base label 30, the patches do not undermine the adherence of the label 3 to either the release backing web 4 or the product or product packaging when transferred.

As illustrated in FIGS. 4*a* and 4*b*, each of the patches 38 may additionally includes a die-cut segment 39 which is separate from the remainder of the patch or only connected by means of a frangible connection. The die-cut segment 39 is provided to assist the removal of the sticker 37 by providing a weak point from which the sticker 37 may be lifted.

The self-adhesive label 3 illustrated in FIGS. 4*a* and 4*b* is suited for automated or manual transfer from its release backing web 4 to a product or product packaging or to documentation. Either before or after transfer, each of the two stickers 37 may be removed from the label 3 by peeling the sticker away from its respective patch 38 of release material so that it may be applied separately from the label 3. Moreover, removal of the stickers 37 does not undermine the adhesion of the remainder of the label 3. Preferably, the covering laminar material 35 is selected to permit over printing and/or manual writing for example.

Turning now to FIGS. 5*a* and 5*b* an alternative self-adhesive label design also manufactured using the apparatus described earlier is illustrated in which, where appropriate, like reference numerals have been used. The self-adhesive label 3 comprises a base label 30 to which a leaflet 40 is attached by means of, for example, a line of adhesive adjacent the fold 41 of the leaflet. In its folded configuration the leaflet 40 is smaller than the base label 30 and thus opposing transverse edge regions 30' of the base label extend beyond the edges of the booklet 40. In this embodiment no covering laminar material is employed. The leaflet is preferably held closed, therefore, by means of a patch of releasable adhesive (not illustrated) on the base label. Preferably the longitudinal edges of the folded leaflet 40 and the base label 3 are co-terminus, however, alternatively the periphery of the folded leaflet 40 may be smaller than the periphery of the base label in both transverse and longitudinal directions.

The base label includes four stickers 37 similar in construction to the stickers 37 of FIGS. 4*a* and 4*b* in that each sticker has a respective patch 38 of release material beneath the sticker and between the sticker 37 and the release backing web 4. However, unlike the embodiment of FIGS. 4*a* and 4*b* the four stickers 37 are located beneath the folded leaflet 40. The stickers 37 are therefore only accessible when the label 3 is opened and may then be peeled from their respective patches 38 of release material.

The base label further includes a fifth sticker 42 provided at one of the longitudinal edges of the base label 3 (the right longitudinal edge in FIGS. 5*a* and 5*b*). The sticker 42 is attached to the remainder of the base label 3 along a weakened tear line 43 such as a line of perforations and includes a corresponding patch 38 of release material located between the sticker 42 and the release backing web 4. As this fifth sticker 42 is provided at an edge of the base label 3, the sticker is free of the release backing web 4 and may easily be held and torn from the remainder of the base label.

As shown in FIG. 5*b*, the rear of the label 3 therefore comprises five patches 38 of release material four of which are surrounded by the adhesive rear surface of the base label 3 and the fifth patch 38 being located at one end of the base label 3.

A further alternative embodiment of a self-adhesive label 3 is illustrated in FIGS. 6*a* and 6*b*. The label comprises a base label 3, a folded leaflet 40 and a covering laminar material 35. The folded leaflet is positioned on the base label so as to leave an edge portion 30' exposed (the left side in FIG. 6*a*). At an edge portion of the base label opposite the edge portion 30', the folded leaflet 40 extends beyond that edge to overlie the release backing web 4 and includes a tab 36. The covering adhesive laminar material 35 which overlies the exposed portion 30' of the base label and the upper surface of the folded leaflet 40 also overlies the release backing web 4 beyond the edge of the folded leaflet 40.

To the right of the folded leaflet 40 in the Figures, a sticker 44 is provided which is attached to the remainder of the base label and to the folded leaflet 40 by means of the covering adhesive laminar material 35. The sticker 44 was die-cut from the label web used to form the base label 3 but has a patch 38 of release material adhered to a portion of its rear surface, between the sticker 44 and the release backing web 4. Only a portion of the rear of the sticker 44 is covered by the patch 38 of release material so that the sticker 44 is adhered to the release backing web 4 along that portion of the rear of the sticker 44 which is not covered by the patch 38. A weakened tear line 45 is provided in the covering laminar material 35 to enable the sticker to be removed from the remainder of the label 3.

Although the self-adhesive labels described above are generally rectangular in shape it will, of course, be apparent that the label may be of any shape and similarly both the stickers and the patches of release material may be of any shape. Also, other arrangements of base label, stickers, with or without booklet or leaflet and with or without a covering laminar material are envisaged without departing from the scope of the invention as defined in the accompanying claims.

The self-adhesive labels 3 described above are particularly suited for use with variable data printed on the labels and/or the stickers. For example in the pharmaceutical industry the stickers can be over-written with variable data so that they may be used to record and label individual prescriptions or may be applied to medical records to indicate the pharmaceutical that is to be or has been administered. Similarly, the self-adhesive labels 3 having one or more removable adhesive stickers are suited for use, for example, in delivery services where the transportation of mail and packages or in the shipping of articles is tracked as separate adhesive stickers from the same single original adhesive label may be used to docket the passage of the mail or packages via various terminals. A further example of the use of such self-adhesive labels is in mail competitions where, stickers from the same competition label may be used to indicate a choice of prize. The above are a few examples of the many circumstances where a self-adhesive label of the types described above would be of use. Similarly, removable labels can be used for promotional purposes, such as in the form of collectable images or as vouchers each with a nominal value.

The invention claimed is:

1. A self-adhesive label manufacturing method comprising the steps of:

providing a web of adhesive label material mounted on a web of release material as a first step; and thereafter die-cutting patches in the web of release material with a rear surface of the web of release material presented uppermost as a second step;

removing from the product of the second step the web of release material from the web of adhesive label material other than said patches as a third step so as to expose an adhesive surface of said web of label material other than those regions of the adhesive surface covered by said patches;

applying to the product of the third step a web of siliconised polyester liner over the exposed adhesive surface of the web of label material and said patches of release material as a fourth step;

after the fourth step turning the web of label material such that the web of label material is uppermost as a fifth step;

after the fifth step die-cutting individual labels in the web of label material whilst the web of label material is uppermost as a sixth step, the labels being aligned with said patches of release material;

either after or simultaneously with the sixth step die-cutting through each individual label but not through the web of siliconised polyester liner immediately over a patch of release material to form a sticker as a seventh step; and, as an eighth step removing waste label material from the product of the seventh step.

2. A method as claimed in claim 1, wherein the web of adhesive label material mounted on the web of release material is provided with the adhesive label material uppermost and prior to the second step of die-cutting patches in the web of release material, the web of label material is turned over so as to present the rear surface of the web of release material uppermost.

3. A method as claimed in claim 1, wherein prior to the second step of the patches of release material being die-cut, the web of label material is printed with text and/or images and wherein the patches of release material are aligned with said printed text and/or images.

4. A method as claimed in claim 1, wherein the web of label material is printed with a series of index markings and the alignment of said patches of release material and said individual labels is determined with respect to said index markings.

5. A method as claimed in claim 1, further comprising a step of mounting a leaflet or booklet on each individual label after the seventh step.

6. A method as claimed in claim 5, wherein said leaflet or booklet is positioned adjacent said sticker die-cut in said label.

7. A method as claimed in claim 5, wherein said leaflet or booklet is positioned so as to overlie said sticker die-cut in said label.

8. A method as claimed in claim 5, further comprising the step of applying a covering laminar material over the uppermost surface of the individual labels and the leaflets or booklets mounted thereon.

9. A method as claimed in claim 1, further comprising a ninth step of applying a covering laminar material over the uppermost surface of the individual labels.

* * * * *